(No Model.)

F. A. LANE.
PIPE JOINT.

No. 402,089. Patented Apr. 23, 1889.

Witnesses
L. E. Brown.
C. O. Foss

Inventor
Frank A. Lane
By his Attorney J. B. Thurston

UNITED STATES PATENT OFFICE.

FRANK A. LANE, OF MANCHESTER, NEW HAMPSHIRE.

PIPE-JOINT.

SPECIFICATION forming part of Letters Patent No. 402,089, dated April 23, 1889.

Application filed April 30, 1888. Serial No. 272,375. (No model.)

*To all whom it may concern:*

Be it known that I, FRANK A. LANE, a citizen of the United States, residing at Manchester, in the county of Hillsborough and State of New Hampshire, have invented certain new and useful Improvements in Pipe-Joints, of which the following is a specification.

This invention relates more especially to a pipe-joint technically known as a "bell-and-spigot joint," and the object in view is to provide convenient and economical means for increasing the strength of such joints.

The invention will be readily understood by reference to the drawings accompanying and forming an inseparable part of the following specification, of which—

Figure 1:
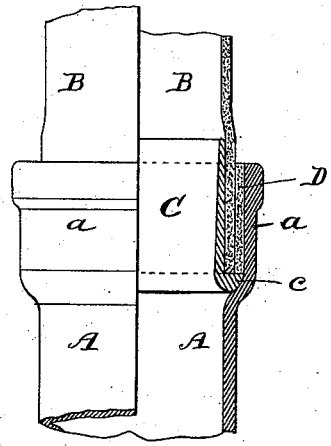
Figure 2:
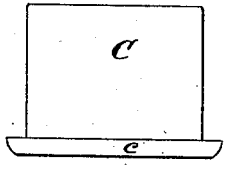
Figure 3:
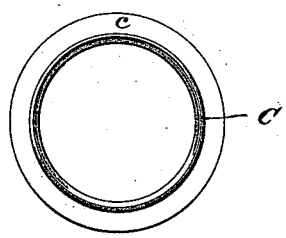

Figure 1 represents in part elevation and part vertical section my improved method of forming a bell-and-spigot joint. Fig. 2 is an elevation of my interior bushing or ferrule for driving into the spigot end of a pipe when forming my improved joint, and Fig. 3 represents a plan view of same.

Similar letters denote like parts.

A represents a piece of non-flexible pipe having the ordinary "bell" end, $a$. B is a pipe which is placed within the bell of the pipe A, the joint being commonly made tight by suitable calking. This method, where both pipes are composed of some non-flexible material, is very satisfactory; but when the pipe B is composed of lead or other soft material the result is quite the reverse, for the reason that the "spigot" end will continually contract with the calking between its exterior and the interior of the bell. I overcome all this difficulty and impart as much stability and strength to a bell-and-spigot joint composed of the union of non-flexible and flexible pipes as though both pipes were non-flexible by simply introducing a ferrule or bushing, C, provided with a flange, $c$, which serves the double purpose of a seat for the calking D and a means for retaining the spigot portion concentric with the bell portion of said joint. The plain end of the ferrule or bushing C is also preferably made thinner than is that end having the flange $c$, so as to present as small an offset in the pipe B as possible. This ferrule or bushing C may be cheaply cast from iron or metal in various sizes, as may be required, and when driven into the pipe B should be sufficiently long to strengthen the same above or beyond the point reached by the bell $a$ of the pipe A, as shown in Fig. 1.

Having described my improvement, what I claim, and desire to secure by Letters Patent, is—

1. The herein-described ferrule, tapering toward one end and provided at the other end with the laterally-extending flange adapted to form a seat for the calking, and convex and tapering on its end face, and thereby adapted to center the ferrule within the bell, in combination with the bell having a tapering or rounded seat adapted to co-operate with said ferrule to bring both parts in line, substantially as set forth.

2. The herein-described ferrule C for pipe-joints, provided at one end with a convex or tapering end face, and having at the same end the laterally-extending flange or shoulder $c$, adapted to form a seat for the calking, said ferrule being tapered or flared on its inner surface toward the end opposite said flange, whereby obstruction of the pipe in which it may be inserted is avoided, substantially as set forth.

In testimony whereof I affix my signature in presence of two witnesses.

FRANK A. LANE.

Witnesses:
J. B. THURSTON,
NATHANIEL E. MARTIN.